United States Patent [19]
Wei et al.

[11] Patent Number: 5,342,564
[45] Date of Patent: Aug. 30, 1994

[54] RAPID SINTERING METHOD FOR PRODUCING ALUMINA-TITANIUM CARBIDE COMPOSITES

[75] Inventors: George C. Wei, Weston; John Walsh, Milford, both of Mass.

[73] Assignee: Valenite Inc., Madison Hts., Mich.

[21] Appl. No.: 999,254

[22] Filed: Dec. 31, 1992

[51] Int. Cl.$^5$ .................. C04B 35/10; C04B 35/52
[52] U.S. Cl. .................................. 264/63; 264/65; 264/66; 501/87
[58] Field of Search .............. 264/60, 63, 65, 66; 501/87

[56] References Cited

U.S. PATENT DOCUMENTS

| | | | |
|---|---|---|---|
| 4,063,908 | 12/1977 | Ogawa et al. | 51/307 |
| 4,356,272 | 10/1982 | Kanemitsu et al. | 501/87 |
| 4,416,840 | 11/1983 | Lee et al. | 264/60 |
| 4,490,319 | 12/1984 | Lee et al. | 264/65 |
| 4,731,349 | 3/1988 | Lee et al. | 501/87 |
| 4,792,353 | 12/1988 | Kramer et al. | 75/235 |
| 5,071,797 | 12/1991 | Hida | 501/87 |
| 5,213,731 | 5/1993 | Song et al. | 264/65 |

FOREIGN PATENT DOCUMENTS 63-134644 of 1988 Japan.

OTHER PUBLICATIONS

Rapid Rate Sintering of Al$_2$O$_3$-TiC Composites for Cutting-Tool Applicati-Lee, et al.
Fast Firing of Alumina Ceramics-Harmer, et al.
Pressureless Sintering of TiC-Al$_2$O$_3$ Composites Ishigaki, et al.
Pressureless Sintering of Alumina-Titanium Carbide Composites-Kim, et al.
Fracture Toughness of the System Al$_2$O$_3$-TiC Ceramics-Furukawa.
Fracture Behaviour of Composites based on Al$_2$O$_3$-Tic, Wahl, et al.
Pressureless-Sintered Al$_2$O$_3$-TiC Composites, Cutler, et al.

Primary Examiner—Jan H. Silbaugh
Assistant Examiner—Christopher A. Fiorilla
Attorney, Agent, or Firm—Bill C. Panagos

[57] ABSTRACT

A method of making a sintered ceramic body for applications such as wear resistant parts and cutting tools. A green body is prepared from a powder mixture including alumina, TiC or (Ti(C,N)), a densification aid, and TiO$_2$. The weight ratio of alumina to TiC in the body is about 40:60 to about 95:5; that of TiO$_2$ to alumina plus TiC is 0:100 to about 2:98. The green body is rapid sintered by heating in a sintering atmosphere to about 1800°–1920° C. for a time sufficient to achieve a density of at least about 4.20 g/cc. The heating rate above about 800° C. is between about 120° C./min and the rate at which the green body experiences thermal shock. The sintering atmosphere is Ar-H$_2$ or N$_2$-H$_2$ in a molar ratio of Ar or N$_2$ to H$_2$ of about 92:8 to 100:0. Carbon monoxide is introduced to the sintering atmosphere only after the sintering temperature exceeds about 1400° C. The amount of CO introduced is selected to inhibit reaction between the alumina and TiC. The CO may be introduced by placing a mass of graphite including adsorbed oxygen and water in the furnace at initiation of sintering such that the mass releases CO only after the sintering temperature exceeds 1400° C. The body may be prepared from a homogeneous slurry, which is dried and shaped to form a green body having a density of at least about 30% of theoretical. The green body may be pre-sintered, isopressed to collapse any cracks, macroscopic pores, or voids, and sintered or sintered and hot-isostatic-pressed.

12 Claims, 2 Drawing Sheets

RAPID SINTERING METHOD FOR PRODUCING ALUMINA-TITANIUM CARBIDE COMPOSITES

BACKGROUND OF THE INVENTION

This invention relates to a rapid sintering method for producing a fully dense ceramic material, in particular an aluminum oxide-titanium carbide or carbonitride composite material suitable for use in cutting tools and wear resistant structural materials.

U.S. Pat. No. 4,490,319 to M. Lee et al. discloses a rapid rate sintering process for ceramics and composites including $Al_2O_3$-TiC. The maximum density achieved by rapid sintering is 98% of the theoretical density. High-purity helium is used as the sintering atmosphere in a molybdenum-element furnace. The examples do not include the use of $TiO_2$ as a sintering aid. The process is a two-step process involving sintering followed by hot isostatic pressing (a sinter-HIP process). M. Lee et al. ("Rapid Rate Sintering of $Al_2O_3$/TiC Composites for Cutting Tool Applications", *Advanced Ceramics Materials* 3 [1], 38–44 (1988)) report the findings disclosed in above-referenced U.S. Pat. No. 4,490,319. In addition, they describe the use of a 100% CO or CO-helium (at partial pressures ranging from 1:40 to 1:1) sintering atmosphere, which their data show to be detrimental to rapid sintering of $Al_2O_3$-TiC.

U.S. Pat. No. 4,063,908 to K. Ogawa et al. discloses the use of $TiO_2$ densification aid for hot pressed $Al_2O_3$-TiC. However, the $TiO_2$ densification aid is used for hot pressing only. Harmer et al. (*Proc. 4th International Mtg. on Modern Ceramics Technologies*, St. Vincent, Italy, May 1979, ed. P. Vincenzini, Elsevier Sci. Publ. Co., Amsterdam, 1980, 155–162) report fast firing of alumina ceramics doped with MgO or $TiO_2$ in a zone sintering furnace at 1850° C. for 2–15 min in air or oxygen.

U.S. Pat. No. 4,797,238 to W. H. Rhodes et al. discloses a rapid sintering process for improving translucence in alumina lamp tubes. The heating rate is at least 0.1° C./sec and less than the rate at which the green body experiences thermal shock. The process uses a flowing gas mixture of nitrogen and at least about 2.5 v/o (volume percent) hydrogen to produce a translucent polycrystalline alumina lamp tube. U.S. Pat. No. 4,762,655 to W. H. Rhodes et al. discloses the use of a sintering atmosphere of nitrogen and an amount of hydrogen of at least 2.5 v/o and less than 75 v/o to produce a translucent polycrystalline alumina lamp tube. In U.S. Pat. No. 4,948,538 to G. C. Wei et al., the dew point of a $N_2$ - 8 v/o $H_2$ sintering atmosphere is controlled while producing a translucent alumina lamp tube.

R. A. Cutler et al. ("Pressureless-sintered $Al_2O_3$-TiC Composites", *Mat. Sci. and Eng.*, A105/106, 183–192 (1988)) disclose sintering of $Al_2O_3$ containing 26.3 w/o (weight percent) TiC and 3.7 w/o $TiH_2$ at 1840° C. in nitrogen to 4.22 g/cc density, or 97.5% of the theoretical density, at a moderate heating rate, 40°–50° C./min, in a graphite furnace. T. Ishigaki et al. ("Pressureless Sintering of TiC-$Al_2O_3$ Composites", *J. Mat. Sci. Letters* 8, 678–680 (1989)) disclose the addition of 0.5 w/o MgO to $Al_2O_3$-25 v/o TiC resulting in a sintered density of 99% of theoretical in uniaxially hot pressed samples.

Y. Kim et al. ("Pressureless Sintering of Alumina-TiC Composites", *J. Am. Cer. Soc.* 72 [8], 1333–37 (1989)) use a setter powder of alumina, TiC, carbon, and combinations thereof to achieve a sintered density of 96.7% of theoretical for $Al_2O_3$ containing 30 w/o TiC and doped with 0.1 w/o MgO. M. Furukawa et al. ("Fracture Toughness of the System $Al_2O_3$-TiC Ceramics", *Nippon Tungsten Review* 18, 16–22 (1985)) disclose that the fracture toughness of alumina composites increases with increasing TiC content up to a maximum at 60 w/o TiC, and then decreases with increasing TiC content.

R. P. Wahl et al. ("Fracture Behavior of Composites based on $Al_2O_3$-TiC", *M. Mat. Sci.* 15, 875–885 (1980)) observe that the fracture toughness of alumina composites in machined-notch tests increases with increasing TiC content and appears to reach a plateau at about 20 w/o TiC. Japanese patent 63-134644 discloses the use of $Al_2O_3$-TiC setter powder to drive the partial pressure of CO to $10^{-4}$–$10^{-3}$ atm during sintering of $Al_2O_3$-TiC. However, no use of $TiO_2$ sintering aid or rapid rate sintering was mentioned.

GTE Valenite Corporation produces $Al_2O_3$ cutting tools with a composition of $Al_2O_3$, TiC, MgO and $ZrO_2$.

SUMMARY OF THE INVENTION

In one aspect, the invention is a method of making a sintered ceramic body. The method involves preparing a ceramic green body from a powder mixture including aluminum oxide, or a precursor thereof, and a hard refractory material selected from the group consisting of titanium carbide and titanium carbonitride, or a precursor thereof, in a weight ratio selected to produce in the sintered ceramic body a weight ratio of aluminum oxide to hard refractory material of about 40:60 to about 95:5. The powder mixture further includes an effective amount of a densification aid and titanium dioxide in an amount selected to produce in the sintered ceramic body a weight ratio of titanium dioxide to aluminum oxide plus hard refractory material of 0:100 to about 2:98. The green body is rapid sintered by heating in a sintering atmosphere by a non-contaminating heating means to a sintering temperature of about 1800°–1920° C. for a time sufficient to densify the green body to a density of at least about 4.20 g/cc. The heating rate above about 800° C. is between about 120° C./min and the rate at which the green body experiences thermal shock. The sintering atmosphere is selected from argon-hydrogen and nitrogen-hydrogen in a molar ratio of argon or nitrogen to hydrogen of about 92:8 to 100:0. Carbon monoxide is introduced to the sintering atmosphere during sintering only after the sintering temperature exceeds about 1400° C. The amount of carbon monoxide introduced is selected to inhibit reaction between the aluminum oxide and the hard refractory material.

In a narrower aspect, the invention involves introducing the carbon monoxide to the sintering atmosphere by placing a mass of graphite including adsorbed oxygen and water in proximity to the green body at initiation of sintering such that the mass releases carbon monoxide only after the sintering temperature exceeds 1400° C.

In another narrower aspect, preparation of the green body involves blending the powder mixture and sufficient inert liquid medium to produce a homogeneous powder mixture slurry. The slurry is dried to remove a sufficient amount of the inert liquid medium to produce a shapable powder mixture. The shapable powder mixture is then shaped to form the green body, the green body having a density of at least about 30 percent of the theoretical density of the sintered ceramic body.

In another aspect, the invention is a method of making a sintered ceramic body involving preparing a ceramic green body from a powder mixture including aluminum oxide and a hard refractory material selected from titanium carbide and titanium carbonitride, in a weight ratio of aluminum oxide to hard refractory material of about 40:60 to about 95:5. The powder mixture further includes an effective amount of a densification aid, up to about 2 weight percent titanium dioxide based on the combined weights of said aluminum oxide, said hard refractory material, and said titanium dioxide, and 0 to about 8 weight percent wax binder based on the total weight of said powder mixture. The green body is presintered in a vacuum or hydrogen by heating to a presintering temperature of about 400°–800° C. for a time sufficient to remove any of the binder present in said green body and to form a presintered green body. The presintered green body is then isopressed at a pressure sufficient to substantially completely collapse any cracks, macroscopic pores, or voids remaining in the presintered green body. The isopressed presintered green body is rapid sintered in a tungsten-element furnace by heating in a sintering atmosphere in the furnace to a sintering temperature of about 1800°–1920° C. for a time sufficient to densify the isopressed presintered green body to a density of at least about 4.20 g/cc. The heating rate above about 800° C. is between about 120° C./min and the rate at which the isopressed presintered green body experiences thermal shock. The sintering atmosphere is selected from argon-hydrogen and nitrogen-hydrogen in a molar ratio of argon or nitrogen to hydrogen of about 92:8 to 100:0. Carbon monoxide is introduced to the sintering atmosphere during sintering only after the sintering temperature exceeds about 1400° C. The amount of the carbon monoxide introduced is selected to inhibit reaction between the aluminum oxide and the hard refractory material.

In a narrower aspect, the invention further involves, after sintering, hot isostatic pressing the sintered body in an inert atmosphere at a temperature of about 1650°–1850° C. and a pressure of about 10–25 ksi for about 5–60 min.

BRIEF DESCRIPTION OF THE DRAWINGS

For a better understanding of the present invention, together with other objects, advantages and capabilities thereof, reference is made to the following Description and appended claims, together with the Drawings, in which:

DETAILED DESCRIPTION OF THE PREFERRED EMBODIMENTS

Figure 1A:
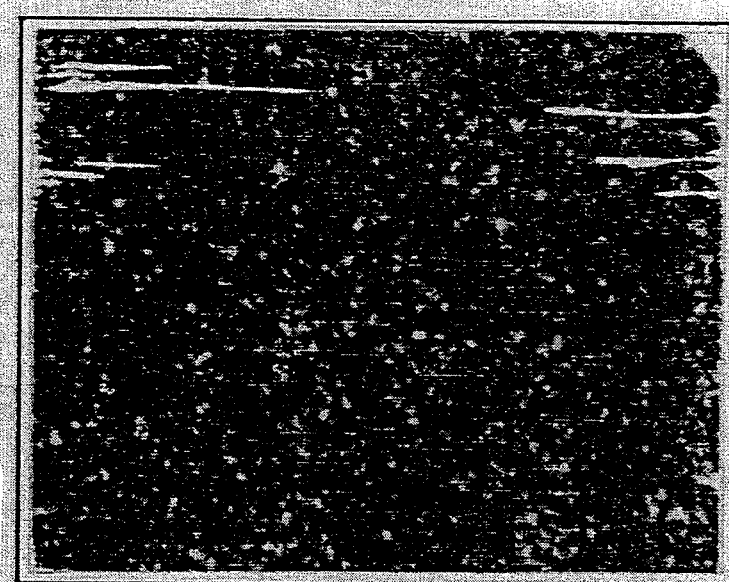
FIGS. 1a, 1b, and 1c are comparative photomicrographs of alumina-TiC composites prepared by sintering (FIGS. 1a and 1b) and by hot-pressing (FIG. 1c)

An exemplary method according to the present invention is described herein. High-density alumina-TiC composite bodies for wear resistant applications, e.g. cutting tools, are produced using starting compositions containing aluminum oxide (alumina or $Al_2O_3$), TiC, $ZrO_2$, and MgO, with or without $TiO_2$. The method involves mixing the starting composition, cold-pressing the powder mixture, and prefiring. The composite bodies are then sintered at high temperatures under a controlled atmosphere of Ar, $N_2$, Ar-8% $H_2$, or $N_2$-8% $H_2$, at a predetermined high heating rate for a time sufficient to produce a high-density body. As used herein, the terms "argon-hydrogen", "nitrogen-hydrogen", "Ar-8% $H_2$", and "$N_2$-8% $H_2$" are intended to denote a mixture of argon or nitrogen with hydrogen in a given molar ratio, for example, a ratio of Ar:$H_2$ or $N_2$:$H_2$ of 92:8. Amounts of $H_2$ in Ar or $N_2$ of 0 to about 8 mole percent are within the present invention. A tungsten-element static furnace is used, with or without a graphite block, for example a graphite pedestal.

In preparing the green body, a homogeneous or substantially homogeneous dispersion of powders and any other components is formed. The components include alumina, hard refractory reinforcing materials such as TiC and/or Ti(C,N), densification aids such as $ZrO_2$ and/or MgO, optionally, dopants such as $TiO_2$, and other components such as $La_2O_3$, $Y_2O_3$, $TiB_2$, WC, and/or TiN. The reinforcing materials may be particles, fibers, whiskers, or platelets. The TiC and/or Ti(C,N) content typically is about 5–60 w/o. For the non-alumina oxides, inorganic or organic precursors can be used. The precursors should decompose to form the oxides and by-product gas or gases that will not react with the carbides, nitrides, and/or borides added. Representative of suitable precursors of the oxide components are carbonates, hydroxides, nitrides, and stearates of titanium, zirconium, yttrium, lanthanum, and magnesium.

Alumina powder of commercial or technical grade is suitable for carrying out the present process. Specifically, the alumina powder should not contain impurities which would have a significantly harmful effect on the density and mechanical properties such as hardness and fracture toughness of the resulting sintered product. Preferably, the alumina powder used is at least about 99.8% pure. For example, Alcoa A-16 alumina powder with a surface area of 8.7 $m^2$/g and an average particle size of 0.45 $\mu m$ can be used. Similarly, Reynolds HPDBM alumina with a surface area of 7 $m^2$/g, an average particle size of 0.35 $\mu m$, and a purity of 99.9% can also be used.

TiC or Ti(C,N) powder with particle sizes of about 1–5 $\mu m$ may be used. For example, Stark TiC powder with a free carbon content less than 0.1 w/o and oxygen content less than 0.2 w/o is suitable. The TiC or Ti(C,N) component serves two functions in the final sintered composites: (1) as a reinforcing component to increase the hardness and fracture toughness, and (2) inhibiting grain growth in the alumina.

Technical-grade powders of $ZrO_2$, MgO, and $TiO_2$, such as Harshaw $ZrO_2$ powder, J. T. Baker MgO powder, and Ultrek 99.94% pure $TiO_2$ powder (all −200 mesh) can be used. $ZrO_2$ acts as a toughening agent as well as a sintering (or densification) aid. $ZrO_2$ forms an eutectic liquid with $Al_2O_3$ at about 1850° C. and therefore acts as an agent for liquid-phase sintering. After sintering, $ZrO_2$ typically is present in the form of a tetragonal or monoclinic zirconia phase, which can impart a toughening effect through a martensitic phase transformation from tetragonal to monoclinic symmetry or through microcracking at the tip of any crack. $TiO_2$ serves as an agent to suppress the reaction of $Al_2O_3$ with TiC, and as a sintering aid. The role of $TiO_2$ in suppression of the reaction of TiC with $Al_2O_3$ is discussed in more detail below. After sintering, $TiO_2$ either becomes dissolved in the $Al_2O_3$ lattice or forms alumina-titanate phase in the alumina matrix. The function of MgO is as a sintering aid. After sintering, MgO is dissolved in Al$_2$O$_3$ and ZrO$_2$.

The alumina and other components or precursors for the other components, can be admixed by a number of techniques, for example, using ball mill containing cobalt-cemented tungsten carbide milling media or an ultrasonic mixer for wet mixing to produce a significantly or substantially uniform or homogeneous dispersion or mixture. The more uniform the dispersion, the more uniform are the microstructure and the properties of the resulting sintered body.

Mixing may be carried out with the powder mixture suspended in a liquid medium to which the other components are added and precursors, if added, dissolved. The liquid should be inert (non-reactive) to the other components. Typical liquids include water, acetone, or hexane. Mixing time varies widely and depends largely on the amount and type of mixing equipment. In general, mixing time ranges from about 1 hour to about 200 hours. A binder or lubricant such as wax or paraffin can be dissolved in the liquid to assist in mixing. The mixed material can be dried by a number of conventional techniques to remove the liquid medium. Preferably, it is dried either by spray drying or by pan drying followed with grinding with mortar and pestle and dry-screening (−100 to −200 mesh).

Contamination of Co and WC may occur in the milled powder because of the use of WC-Co milling media. However, a small amount of WC and Co contamination is not believed to be harmful to density or strength. Scanning electron microscopy, energy dispersive x-ray analysis and image analysis indicated about 1-2 v/o WC derived from the milling media was present in the sintered bodies described herein.

A number of techniques can be used to shape the homogeneous powder mixture or dispersion into a green body. For example, it can be extruded, injection molded, die-pressed, isostatically pressed, or slip cast to produce the green body of desired shape. For some of these shaping methods, it is preferred to add shaping aids such as a wax binder or a lubricant. As used herein, the term "wax binder" includes organic waxes, paraffin, Carbowax (polyethylene glycol), and PVA (polyvinyl alcohol); the term "lubricant" includes oleic acid and stearic acid. Any lubricants, binders, or similar materials used in shaping the powder mixture should have no significant deleterious effect on the properties of the resulting sintered body. Such materials are preferably of the type which evaporate on heating at relatively low temperatures, preferably below 500° C., leaving no significant residue. The green body should have a density of at least 30%, and preferably 45% or higher, of the theoretical density for the alumina-TiC composite to promote densification during sintering and attainment of near-theoretical density.

Preferably, before sintering, the green body or compact is prefired at a temperature ranging from about 400° C. to about 800° C. Typically, the prefiring temperature is about 500°-650° C. at a heating rate of about 2° C./min to eliminate impurities, including shaping aids and any remaining liquid, which would have a significantly deleterious effect on the density of the sintered body. The particular prefiring temperature and period is determinable empirically, and depends largely on the level of impurities present and on the thickness of the body; it generally ranges from about one to eight hours. Such prefiring allows the sintering atmosphere to be free of impurities, and imparts sufficient strength to the green body to allow it to be more easily handled and machined, if necessary.

The green body is then sintered to achieve full densification, preferably at or near the theoretical density for the materials incorporated into the body. The maximum sintering temperature typically is about 1800°-1920° C., with sintering time typically from about 5 min to 2 hours. The heating rate to reach sintering temperature typically is about 10°-30° C./min from room temperature to about 800° C. From about 800° C. to the maximum sintering temperature, the heating rate is rapid, typically at or above about 100° C./min (preferably at least about 120° C./min) and less than the rate at which the prefired body experiences thermal shock. The heating rate at which the body experiences thermal shock fracture is size-dependent and can readily be determined by empirical means. This maximum heating rate is typically at or above about 400° C./min.

The sintering atmosphere is Ar, N$_2$, Ar-8% H$_2$, or N$_2$-8% H$_2$, and is typically a flowing atmosphere. A tungsten-element, static furnace is used. The prefired bodies may be placed on, e.g., a molybdenum foil above the tungsten hearthplate. Optionally, a graphite pedestal or block may be placed in the furnace. Samples may then be placed on a molybdenum foil which rests on the graphite block. This graphite block may then be used to control the local atmosphere in the vicinity of the bodies during heating and sintering. The furnace may be evacuated to about 10$^{-5}$ torr, back-filled with the sintering atmosphere, and then the flowing atmosphere may be established. Typically, the flow rate of the flowing atmosphere is set at about 50-500 cc/min, with a rate of about 200 cc/min preferred.

The following Examples are presented to enable those skilled in the art to more clearly understand and practice the present invention. These Examples should not be considered as a limitation upon the scope of the present invention, but merely as being illustrative and representative thereof.

EXAMPLE 1

Alumina-TiC composites were prepared containing 69.3 w/o Al$_2$O$_3$ (Alcoa A-16), 26.5 w/o TiC (Stark) particulates, 0.2 w/o MgO (Baker), and 4 w/o ZrO$_2$ (Hatshaw). This starting composition was selected to optimize the properties of the material, for example, the fracture toughness (at room temperature and at high temperature) and high temperature oxidation resistance.

The powders and a binder were dispersed in acetone. The binder was paraffin in an amount of 8 w/o of the powder-binder mixture. The resulting slurry was ball-milled with cobalt-cemented tungsten carbide milling media, then was spray-dried. The dried powder was shaped into pellets about 0.65 by 0.65 by 0.35 inch. The powder mixture was uniaxially pressed at 35 ksi to 58% green density (Powder Process A). The green bodies were heated in vacuum at 2°-3° C./min to 300° C. for 30 min and then to 500° C. for 2 hours to remove the binder.

Sintering was conducted in a tungsten-element static furnace, i.e., a furnace equipped with tungsten heating elements, Mo heat shields, and tungsten hearthplate. Samples were placed on Mo foils on the tungsten hearthplate without setter powder. The furnace was evacuated to 10$^{-5}$ tort and back-filled with flowing Ar-8% H$_2$, Ar-4% H, or Ar. Temperature was increased at a rate of 10°-30° C./min from room temperature to 500° C., and held at that temperature for 2 h.

From 500° C. to the predetermined maximum sintering temperature, the heating rate was 75°-90° C./min. The holding time at the maximum sintering temperature was 15-60 min. After sintering, the samples were cooled to room temperature at a rate of 30°-130° C./min. During heating, the relatively slow heating rate at temperatures from room temperature to 500° C. and the hold at 500° C. were effected to avoid thermal shock fracture. The results are shown in Table I, and are compared to those achieved by hot pressing a sample (Sample 1) of the same composition.

EXAMPLE 2

Alumina-TiC composites were prepared from the same amounts of the powders used in Example 1. The powders and a binder were dispersed in acetone. The binder was paraffin in an amount of 8 w/o of the powder-binder mixture. The resulting slurry was ball-milled with cobalt-cemented tungsten carbide milling media, then was spray-dried. The dried powder was shaped into pellets about 0.65 by 0.65 by 0.35 inch. The powder mixture was uniaxially pressed at 35 ksi to 58% green density (Powder Process A). The green bodies were heated in vacuum at 2°-3° C./min to 300° C. for 30 min and then to 500° C. for 2 hours to remove the binder.

Alternatively, the dried powder mixture was uniaxially pressed at 10 ksi and isopressed at 22 ksi to 66% green density (Powder Process B). The green bodies were heated in vacuum at 2°-3° C./min to 250° C. for 1 hour, and then to 650° C. for 8 hours to remove the binder.

In another alternative, the spray-dried powder was first heated to 500° C. for 2 hours in hydrogen or in vacuum to remove the binder (Powder Process C). The debindered powder was screened through a Teflon 100 mesh screen. The screened powder was uniaxially pressed at 10 ksi. The pellets were then subjected to another heat treatment at 250° C. for 1 hour and then 650° C. for 8 hours in vacuum or hydrogen at a heating rate of about 2°-3° C./min in order to completely remove the binder and to impart some strength for handling. This alternative procedure was found to be preferable because the binder was completely removed, and delamination, which can occur in prefired bodies, was eliminated. After prefiring, the bodies of Powder Process C were isopressed at 22 ksi in order to collapse any cracks, large pores, or voids remaining after the binder was removed. This step was found to be advantageous because it eliminated large voids in the sintered bodies that could act as critical flaws.

Sintering of all samples was conducted in a tungsten-element static furnace, i.e., a furnace equipped with tungsten heating elements, Mo heat shields, and tungsten hearthplate. Samples were placed on Mo foils on the tungsten hearthplate without setter powder. The furnace was evacuated to $10^{-5}$ torr and back-filled with flowing $N_2$-8% $H_2$, Ar-8% $H_2$, $N_2$, or Ar. Temperature was increased at a rate of 10°-30° C./min from room temperature to 550° C. or 800° C., and held at that temperature for 30 min to 1h. From 550° C. or 800° C. to the predetermined maximum sintering temperature, the heating rate was 15°-130° C./min. The holding time at the maximum sintering temperature was 5-60 min. After sintering, the samples were cooled to room temperature at a rate of 30°-130° C./min. During heating, the relatively slow heating rate at temperatures from room temperature to 550° C. or 800° C. and the hold at 550° C. or 800° C. were effected to avoid thermal shock fracture. Table II shows the results achieved by sintering the samples of Example 2.

TABLE I

| SAMPLE | HEATING RATE (°C./min) | SINTERING TEMP. (°C.) | SINTERING TIME (min) | SINTERING ATMOSPHERE | DENSITY (g/cc) | REMARKS |
| --- | --- | --- | --- | --- | --- | --- |
| 1 (hot-press comparative sample) | — | — | — | — | 4.244 | — |
| 2 | 75 | 1835 | 15 | Ar-4% $H_2$ 14 min, Ar 1 min | 4.085 | — |
| 3 | 75 | 1880 | 15 | Ar-8% $H_2$ | 4.100 | — |
| 4 | 75 | 1900 | 60 | Ar-8% $H_2$ | 4.096 | — |
| 5 | 75 | 1950 | 15 | Ar-8% $H_2$ | — | Sample bloated, discolored |
| 6 | 90 | 1910 | 15 | Ar-8% $H_2$ | 4.098 | — |
| 7 | 90 | 1910 | 15 | Ar | 4.096 | Discolored |

TABLE II

| SAMPLE | POWDER PROCESS | HEATING RATE (°C./min) | SINTERING TEMP. (°C.) | SINTERING TIME (min) | SINTERING ATMOSPHERE | DENSITY (g/cc) | REMARKS |
| --- | --- | --- | --- | --- | --- | --- | --- |
| 8 | A | 90 | 1910 | 15 | $N_2$-8% $H_2$ | 4.076 | — |
| 9 | A | 90 | 1910 | 45 | $N_2$-8% $H_2$ | — | Re-sinter of Sample 8, bloated |
| 10 | B | 90 | 1910 | 45 | $N_2$-8% $H_2$ | 4.122 | no cracks |
| 11 | B | 90 | 1910 | 45 | $N_2$-8% $H_2$ | 4.121 | no cracks |
| 12 | B | 90 | 1910 | 45 | $N_2$-8% $H_2$ | 4.121 | no cracks |
| 13 | B | 90 | 1910 | 45 | $N_2$-8% $H_2$ | — | cracked |
| 14 | C | 90 | 1910 | 45 | $N_2$-8% $H_2$ | 4.051 | no cracks |
| 15 | C | 10 | 1910 | 45 | $N_2$-8% $H_2$ | 3.970 | discolored, cracked |
| 16 | C | 100 | 1930 | 3 | $N_2$-8% $H_2$ | 4.050 | cracked |
| 17 | C | 100 | 1910 | 3 | $N_2$-8% $H_2$ | 4.030 | no cracks |
| 18 | A | 100 | 1910 | 3 | $N_2$-8% $H_2$ | 4.061 | no cracks |
| 19 | C | 100 | 1910 | 3 | $N_2$-8% $H_2$ | 4.020 | no cracks |

Without the use of TiO$_2$ dopant, Sample 10 achieved a sintered density of 4.122 g/cc by sintering at 1910° C. for 45 min at a heating rate of 90° C./min in N$_2$-8% H$_2$. Sintering at higher temperatures encouraged bloating as shown, for example, in Sample 5, while lower temperatures led to lower sintered density as shown, for example, in Sample 2, other parameters being the same. The heating rate also had a pronounced effect on the final density. Sample 14, with a heating rate of 90 ° C./min, was significantly more dense than Sample 15, heated at 10 ° C./min, other parameters being the same.

The use of N$_2$-8% H$_2$ or Ar-8% H$_2$ sintering atmosphere appeared to decrease the tendency for brownish discoloration seen in the TiO$_2$-free samples sintered in Ar, for example Sample 7, but did not appear to enhance the sintered density. The properties of samples sintered in N$_2$-8% H$_2$ did not appear to be different from the samples sintered in Ar-8% H$_2$. The formation of Ti(C,N) solid solution was not detected by x-ray diffraction analyses of the samples sintered in Overall, surface conditions of the sintered samples of the standard starting composition without TiO$_2$ indicated Ar-8% H$_2$ or N$_2$-8% H$_2$ was advantageous over pure At. X-ray diffraction analysis of the TiC phase in the composites sintered in N$_2$-8% H$_2$ indicated a lattice parameter of 4.328 Å, which was close to that for the starting, stoichiometric TiC powder, suggesting that carbon deficiency or the formation of Ti(C,O) did not occur.

Figure 1B:
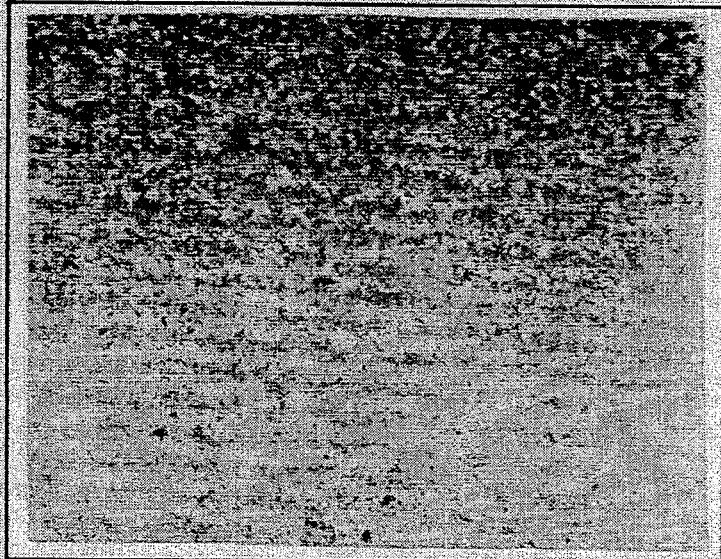
Figure 1C:
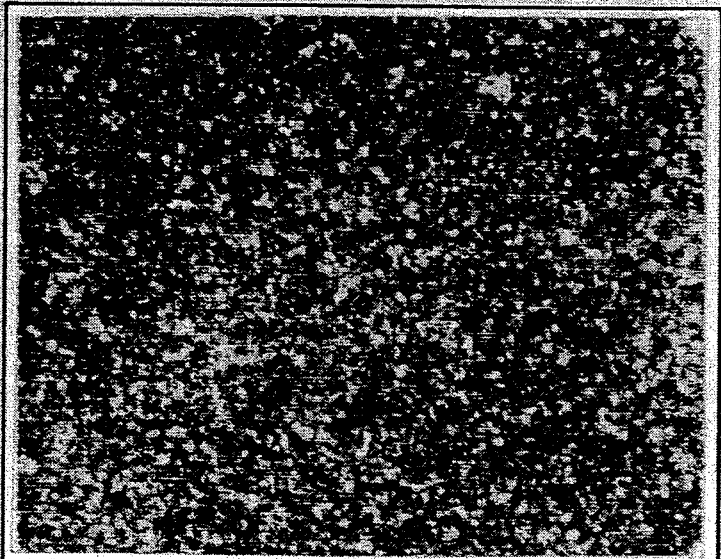

Metallographic examination, illustrated in FIGS. 1a, 1b, and 1c, shows that the microstructures of the Al$_2$O$_3$-TiC samples, for example Sample 6 shown in FIG. 1a or Sample 12 shown in FIG. 1b, were close to that of the high-density, hot-pressed product of the same composition (Sample 1) shown in FIG. 1c. Microhardness measurements showed an average Knoop hardness equivalent to that measured for the hot pressed product. The fracture toughness values of sintered samples, Samples 2, 3, 6, and 7, obtained by the indentation technique, were higher than that of Sample 1, the hot-pressed product. In summary, sintering of Al$_2$O$_3$-TiC doped with 0.2 w/o MgO and 4 w/o ZrO$_2$ at 1910° C. for 45 min at a heating rate of 90° C. under N$_2$-8% H$_2$ atmosphere in a tungsten-element furnace generally produced bodies having densities over 4.12 g/cc with a Knoop hardness comparable to and a fracture toughness higher than those measured for the hot-pressed Al$_2$O$_3$-TiC of the same starting composition.

EXAMPLE 3

Al$_2$O$_3$-TiC composites consisting of a starting composition of 69.3 w/o Al$_2$O$_3$, 26.5 w/o TiC, 0.2 w/o MgO, and 4 w/o ZrO$_2$ were doped with various amounts of Limo, prepared by Powder Process C, described above, and sintered as described for Example 2 and shown in Table III. The results are shown in Table III.

EXAMPLE 4

Table IV lists results of sintering of Al$_2$O$_3$-TiC composites consisting of a starting composition of 69.3 w/o Al$_2$O$_3$ w/o TiC, 0.2 w/o MgO, and 4 w/o ZrO$_2$ doped with various additives, prepared by Powder Process C, described above, and sintered as described for Example 2 and shown in Table IV. A predetermined amount of TiO$_2$ or other additive was added to the de-bindered powder using a mortar and pestle, preferably a B$_4$C mortar and pestle, before screening and uniaxial pressing.

TABLE III

| SAMPLE | Li LEVEL (PPM) | HEATING RATE (°C./min) | SINTERING TEMP. (°C.) | SINTERING TIME (min) | SINTERING ATMOSPHERE | DENSITY (g/cc) | REMARKS |
|---|---|---|---|---|---|---|---|
| 20 | 0 | 90 | 1910 | 45 | N$_2$-8% H$_2$ | 4.084 | — |
| 21 | 18 | 90 | 1910 | 45 | N$_2$-8% H$_2$ | 4.091 | Large voids |
| 22 | 18 | 90 | 1910 | 45 | N$_2$-8% H$_2$ | 4.021 | Bloated, cracked |
| 23 | 36 | 90 | 1910 | 45 | N$_2$-8% H$_2$ | 4.078 | — |
| 24 | 72 | 90 | 1910 | 45 | N$_2$-8% H$_2$ | 4.087 | — |
| 25 | 72 | 90 | 1910 | 45 | N$_2$-8% H$_2$ | 4.026 | Bloated, cracked |

TABLE IV

| SAMPLE | ADDITIVE | HEATING RATE (°C./min) | SINTERING TEMP. (°C.) | SINTERING TIME (min) | SINTERING ATMOSPHERE | DENSITY (g/cc) | REMARKS |
|---|---|---|---|---|---|---|---|
| 26 | None | 90 | 1910 | 45 | N$_2$-8% H$_2$ | 4.061 | — |
| 27 | None | 90 | 1910 | 45 | N$_2$-8% H$_2$ | 4.061 | — |
| 28 | 500 ppm Al | 90 | 1910 | 45 | N$_2$-8% H$_2$ | 3.990 | — |
| 29 | 0.1 w/o Al | 90 | 1910 | 45 | N$_2$-8% H$_2$ | 3.940 | — |
| 30 | 0.1 w/o Al | 90 | 1910 | 45 | N$_2$-8% H$_2$ | 3.970 | — |
| 31 | 0.1 w/o Al | 90 | 1910 | 45 | N$_2$-8% H$_2$ | 4.020 | — |
| 32 | 0.2 w/o Al | 90 | 1910 | 45 | N$_2$-8% H$_2$ | 3.980 | — |
| 33 | 0.1 w/o BN | 90 | 1910 | 45 | N$_2$-8% H$_2$ | 3.960 | — |
| 34 | 0.2 w/o BN | 90 | 1910 | 45 | N$_2$-8% H$_2$ | 3.980 | — |
| 35 | 0.2 w/o TiO$_2$ | 90 | 1910 | 45 | N$_2$-8% H$_2$ | 4.030 | — |
| 36 | 1 w/o TiO$_2$ | 90 | 1910 | 45 | N$_2$-8% H$_2$ | 4.153 | — |
| 37 | 2 w/o TiO$_2$ | 90 | 1910 | 45 | N$_2$-8% H$_2$ | 4.030 | Bloated |
| 38 | 1 w/o TiO$_2$ | 122 | 1910 | 45 | N$_2$-8% H$_2$ | 4.130 | — |
| 39 | 1 w/o TiO$_2$ | 122 | 1910 | 45 | N$_2$-8% H$_2$ | 4.040 | — |
| 40 | 1 w/o TiO$_2$ | 122 | 1910 | 45 | N$_2$-8% H$_2$ | 4.060 | — |
| 41 | 1 w/o TiO$_2$ | 122 | 1910 | 45 | N$_2$-8% H$_2$ | 4.000 | — |
| 42 | None | 124 | 1850 | 60 | N$_2$-8% H$_2$ | 4.118 | * |
| 43 | None | 124 | 1850 | 60 | Ar | 4.116 | * |
| 44 | None | 124 | 1850 | 60 | Ar | 3.990 | — |
| 45 | None | 124 | 1850 | 60 | Ar | 4.270 | * |
| 46 | None | 124 | 1850 | 60 | Ar | 3.980 | — |
| 47 | 1 w/o TiO$_2$ | 124 | 1850 | 60 | N$_2$-8% H$_2$ | 3.860 | — |

TABLE IV-continued

| SAMPLE | ADDITIVE | HEATING RATE (°C./min) | SINTERING TEMP. (°C.) | SINTERING TIME (min) | SINTERING ATMOSPHERE | DENSITY (g/cc) | REMARKS |
| --- | --- | --- | --- | --- | --- | --- | --- |
| 48 | 1 w/o TiO$_2$ | 124 | 1850 | 60 | N$_2$-8% H$_2$ | 3.93 | — |
| 49 | 1 w/o TiO$_2$ | 124 | 1850 | 60 | N$_2$-8% H$_2$ | 4.09 | — |
| 50 | 1 w/o TiO$_2$ | 124 | 1850 | 60 | N$_2$-8% H$_2$ | 4.260 | * |
| 51 | 1 w/o TiO$_2$ | 124 | 1850 | 60 | N$_2$-8% H$_2$ | 4.226 | Discolored, * |
| 52 | 1 w/o TiO$_2$ | 124 | 1850 | 60 | Ar | 4.280 | * |

*: Graphite block was used. Otherwise, no graphite block was used.

In Examples 3 and 4, several dopants were explored for suppression of the following reaction, Reaction 1, believed to be retarding the densification process:

$$3Al_2O_3 + 2TiC \leftrightarrow 3Al_2O_3 + 2TiO_2 + 2CO_{(g)}. \quad (1)$$

Among the dopants tested (Li, Al, B, and TiO$_2$), TiO$_2$ was found to be most effective in terms of the final density achieved, as shown in Tables I–IV. Compacts of the standard composition (69.3 w/o Al$_2$O$_3$, 26.5 w/o TiC, 0.2 w/o MgO, and 4 w/o ZrO$_2$) doped with 1 w/o TiO$_2$ (Sample 36) achieved a density of 4.153 g/cc by sintering at 1910° C. for 45 min at a heating rate of 90° C./min in N$_2$-8% H$_2$. This density is higher than that achieved (4.05 g/cc) for the same starting composition similarly prepared, but without the TiO$_2$ dopant (Sample 14). The level of TiO$_2$ dopant was varied from 0.2 to 2 w/o, with the 1 w/o level showing the best density (Samples 35, 36, and 37). The above results confirm that Reaction (1) must be suppressed in order to improve the sintered density.

To suppress Reaction 1, two modifications were made to the process: (a) 1 w/o TiO$_2$ dopant was added to the starting composition, and (b) a piece of graphite block was placed in the furnace on which the prefired body sat. Graphite is known to release carbon monoxide gas, CO$_{(g)}$, at high temperatures. The CO$_{(g)}$ released from graphite serves to move the direction of Reaction (1) to the left, thus inhibiting the reaction of Al$_2$O$_3$ with TiC. According to Japanese Patent No. 63-134644, the optimal partial pressure of CO$_{(g)}$ during sintering of Al$_2$O$_3$-TiC should be about $10^{-4}$ to $10^3$ atm. Thermodynamic calculation by Kim and Lee ("Pressureless Sintering of Alumina-Titanium Carbide Composites," J.Am. Cer. Soc. 72 [8] 1333–37 (1989)) showed the equilibrium partial pressure of CO$_{(g)}$ was $4.4 \times 10^{-3}$ atm at 1900° C. If the CO$_{(g)}$ level is too high, TiC tends to react to form TiO$_2$ and carbon. According to M. Lee and M. P. Borom, "Rapid Rate Sintering of Al$_2$O$_3$-TiC Composites for Cutting Tool Applications," Adv. Cer. Mat. 3 [1] 38–44 (1988), if the level of CO$_{(g)}$ is higher than 2.5 v/o, the sintered density decreases by 2–3% of theoretical. In the prior art, prefired bodies were typically embedded in a setter powder consisting of mixtures of Al$_2$O$_3$ and TiC to achieve the equilibrium partial pressure of CO$_{(g)}$ during sintering. To test its effect on Reaction 1, a graphite block weighing about 100g was placed in the tungsten-element furnace with a chamber volume of about 2 liters. Graphite adsorbs oxygen and moisture at room temperature and outgasses at high temperatures (for example, about 1800° C.), and the amount of outgassing is about 0.008% by weight with CO$_{(g)}$, being the dominant outgassing product. (See G. C. Wei, C. D. Reynolds and G. Brassell, "Outgassing Behavior of Carbon-Bonded Carbon-Fiber Thermal Insulation," Proc. Carbon Conf. p. 249–250 (1979).) This corresponds to about $3.1 \times 10^{-2}$ atm partial pressure of CO$_{(g)}$ at 1800° C., which is sufficiently high to suppress Reaction 1, and sufficiently low so as not to react with TiC.

Sampling and analysis of the gaseous atmosphere during sintering was difficult because of its transient nature. The results of sintering of Al$_2$O$_3$-TiC in the presence of a graphite pedestal, however, strongly indicated that the outgassing was beneficial to the sintered density (Samples 42, 43, 45, 50, 51, and 52).

The use of the graphite block to modify the sintering atmosphere in the tungsten-element furnace has some advantages over the use of setter powder or flowing Ar-CO gas mixtures. First, graphite outgassing starts at about 1600° C. and reaches a maximum at about 1800° C. Thus, below these temperatures, the sintering atmosphere is essentially pure Ar, and above about 1800° C. the Ar gas effectively contains a small level of CO. Thus, the CO is generated at the temperatures where the presence of CO is needed. This method of in-situ generation of CO eliminates the need for a costly storage facility for gas cylinders containing Ar-CO mixtures. The technique also releases CO in the temperature range ($\geq 1600°$ C.) where the sample is about to reach a closed-porosity stage, and where a small amount of CO is needed to suppress the reaction of Al$_2$O$_3$ with TiC. Attempts to dope the sintering atmospheres with CO at temperatures from 800° to 1600° C. did not appear to be beneficial; in fact, bloating or expansion was observed. If the Ar sintering atmosphere contains some CO at the temperature range from room temperature to 1400° C., where the samples are in an open-porosity state, CO might actually (a) reduce Al$_2$O$_3$ to release oxygen-bearing gaseous species which would oxidize TiC to form TiO$_2$, or (b) directly react with TiC, as shown in Reaction 2:

$$TiC + 2CO \leftrightarrow TiO_2 + 3C. \quad (2)$$

Reaction 2 takes place only if the temperature is below 1500K, as discussed in Kim and Lee's paper. The above two possibilities can cause the bloating at the temperature range from 800° to 1600° C. in CO-containing atmosphere, as observed by Lee and Borom. Therefore, the in-situ generation of CO via using the graphite block has the advantage of releasing the desired level of CO at the appropriate temperature range.

When the graphite block was used, Ar was preferred over Ar-8% H$_2$ or N$_2$-8% H$_2$. This was because H$_2$ can react with graphite and CO to form CH$_4$, which can affect densification of Al$_2$O$_3$-TiC composites. This effect was confirmed by the results of the sintering experiments (Samples 51 and 52).

With the two modifications: (a) adding 1 w/o TiO$_2$ to the starting composition, and (b) placing a graphite block in the tungsten-element furnace to introduce a small amount of CO$_{(g)}$, sintering temperatures ranging from 1750° C. to 1880° C. were suitable, with the preferred temperature being 1860° C. Above 1880° C., the specimens bloated, and below 1750° C., high sintered density was difficult to attain. Ar sintering atmosphere was found to be preferred over Ar-8% H$_2$ or N$_2$-8% H$_2$, when the above two modifications were employed.

Compacts sintered at 1850° C. for 1 hour at a heating rate of 124° C./min in Ar doped with a small amount of CO via the graphite block, had densities of 4.28 g/cc (Sample 52). When the sintering atmosphere was N$_2$-8% H$_2$ plus a small amount of CO (via the graphite block), the sintered density became 4.23 g/cc (Sample 51). These results were reproduced on repeating runs. Thus, the density achieved in the hot pressed sample (Sample 1, 4.244 g/cc) has been matched, and even exceeded, by using a combination of (a) rapid rate sintering, (b) adding TiO$_2$ to the compact as a sinter aid, and (c) adding CO to the sintering atmosphere via the graphite block. The microstructure of the sintered bodies as processed appears to be uniform upon optical microscopic examination.

Hardness and fracture toughness of some of the above samples were measured. The evaluated samples included some of the 1 w/o TiO$_2$-doped A;$_2$O$_3$-TiC with a starting composition of 69.3 w/o Al$_2$O$_3$, 26.5 w/o TiC, 0.2 w/o MgO, and 4 w/o ZrO$_2$ sintered at 1850° C. for 1 h at a heating rate of 124° C./min under Ar containing a small amount of CO (via the graphite block), as well as the hot-pressed Al$_2$O$_3$-TiC composite of the same starting composition without the TiO$_2$ dopant. Table V summarizes the hardness and fracture toughness data of the sintered Al$_2$O$_3$-TiC composites.

TABLE V

| SAMPLE | DENSITY (g/cc) | KNOOP HARDNESS* (kg/mm$^2$) | FRACTURE TOUGHNESS* (MPa · m$^{\frac{1}{2}}$) |
| --- | --- | --- | --- |
| hot-pressed 1 | 4.244 | 1.000 | 1.00 |
| sintered: | | | |
| 2 | 4.085 | 0.876 | 1.13 |
| 3 | 4.100 | 0.828 | 1.24 |
| 4 | 4.096 | 0.795 | 0.956 |
| 6 | 4.098 | 0.998 | 1.18 |
| 7 | 4.096 | 0.854 | — |
| 12 | 4.121 | 0.929 | — |
| 17 | 4.030 | 0.866 | — |
| 18 | 4.061 | 0.791 | — |
| 21 | 4.091 | 0.906 | — |
| 22 | 4.021 | 0.906 | — |
| 50 | 4.260 | 1.01 | 1.00 |
| 51 | 4.226 | 0.96 | 1.08 |
| 52 | 4.280 | 1.00 | 1.08 |

*Normalized to that of hot-pressed Sample 1.

The density and hardness values of the sintered Samples 50, 51, and 52 are equivalent to that of hot-pressed Sample 1 containing no TiO$_2$. The fracture toughness value of sintered Sample 50 is equivalent to the hot-pressed sample, while those of sintered Samples 52 and 53 are about 8% higher. Overall, the properties of the TiO$_2$-doped specimens sintered at 1860° C. for 60 min in Ar containing a small amount of CO (via the graphite block) at a heating rate of 124° C./min (Samples 50–52) are improved over the hot-pressed specimen containing no TiO$_2$.

Figure 2A:
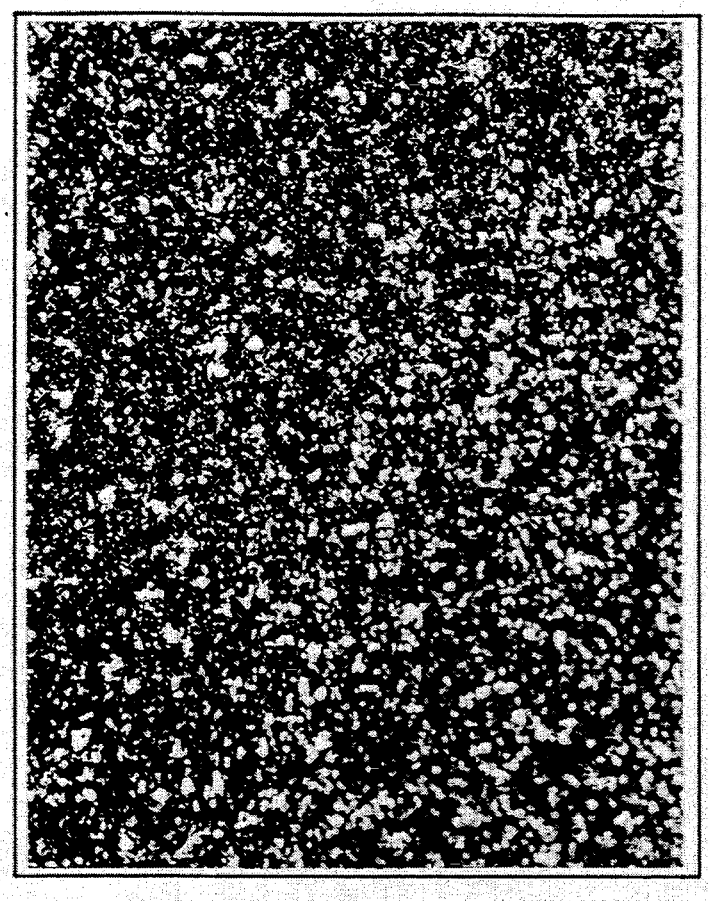
FIGS. 2a and 2b are comparative photomicrographs of alumina-TiC composites prepared by hot-pressing and by sintering, respectively.
Figure 2B:
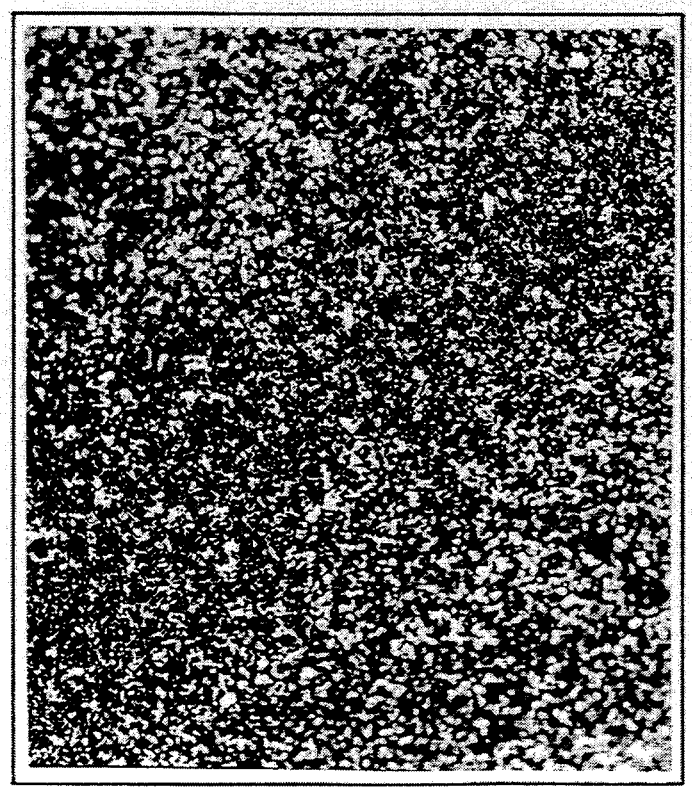

FIGS. 2a and 2b, photomicrographs of the microstructure of Samples 1 and 52 respectively, show TiC particles dispersed in Al$_2$O$_3$ matrix. Microstructural analysis of Sample 52 showed that the average grain size of Al$_2$O$_3$ matrix was about 3 μm. Precipitates of Al$_2$TiO$_5$ were found inside grains that appeared to be Al$_2$O$_3$-TiO$_2$ solid solution. Tetragonal ZrO$_2$ phase was located at grain boundaries. A minor amount of WC phase derived from the powder milling media was also found at grain boundaries.

The major differences in the microstructure of the sintered Sample 52 vs hot-pressed Sample 1 were (1) Al$_2$TiO$_5$ precipitates were inside grains in the sintered specimen, but at grain boundaries in the hot-pressed specimen, and (2) ZrO$_2$ phase appeared to include tetragonal and monoclinic phases in the sintered specimen, but only monoclinic in the hot-pressed specimen. The difference might be related to the higher temperature (1800° C. vs 1700° C.) and a fast cooling (~100° C./min vs <100° C./min) used in sintering vs hot-pressing. Although the microstructural difference may have contributed somewhat to the improved properties in the sintered bodies, even achievement of equivalent properties without hot-pressing is a significant advance in the art.

The starting composition used in the Examples above contains 69.3 w/o Al$_2$O$_3$, 26.5 w/o TiC particulates, 0.2 w/o MgO, and 4 w/o ZrO$_2$. The invention, however, is not limited to this composition. For example, the carbide content may be about 5–60 w/o. Similarly, other proportions of or compounds suitable for use as sintering aids may be used. TiN may be added for further sinterability and/or property (more thermal shock resistant) advantage. Ti(C,N) particulates could be used in place of TiC particulates for higher hardness, or TiC whiskers could be substituted for TiC particulates for higher fracture toughness.

As to the process steps, microwave heating may be substituted for the described W-element, Mo-shield furnace heating. The partial pressure of CO may be dynamically controlled during heating since reaction (1) and the equilibrium pressure of CO are temperature dependent. The sintered specimens can subsequently be hot isostatically pressed (HIPed) in a cladless configuration to further eliminate residual pores.

The method described herein presents to the art a process for achieving properties at least equivalent to those obtained by hot-pressing in alumina-TiC composites. Excellent results are achieved by a method including (1) the starting composition of Al$_2$O$_3$, TiC, sintering aids, and, optionally, TiO$_2$ in combination with (2) a rapid rate of heating, (3) the use of N$_2$-8% H$_2$ sintering atmosphere for the starting composition without TiO$_2$ or the use of Ar sintering atmosphere for the starting composition with TiO$_2$, (4) the use of a graphite block in the tungsten-element furnace under Ar, and (5) the double-burnout, double-pressing (powder debinding-pressing-burnout-pressing) procedure to assure elimination of delamination and large voids. The process achieves density, hardness, and fracture toughness equivalent to or better than those produced in the hot-pressed bodies of similar composition without TiO$_2$.

While there has been shown and described what are at present considered the preferred embodiments of the invention, it will be obvious to those skilled in the art that various changes and modifications can be made therein without departing from the scope of the invention as defined by the appended claims.

We claim:

1. A method of making a sintered ceramic body comprising the steps of:
  preparing a ceramic green body from a powder mixture comprising aluminum oxide, or a precursor thereof, and a hard refractory material selected from the group consisting of titanium carbide and titanium carbonitride, or a precursor thereof, in a weight ratio selected to produce in said sintered ceramic body a weight ratio of aluminum oxide to hard refractory material of about 40:60 to about 95:5, and further comprising an effective amount of a densification aid, and titanium dioxide in an amount selected to produce in said sintered ceramic body a weight ratio of titanium dioxide to aluminum oxide plus hard refractory material of 0:100 to about 2:98;

rapid sintering said green body by heating in a sintering atmosphere by a non-contaminating heating means to a sintering temperature of about 1800°–1920° C. for a time sufficient to densify said green body to a density of at least about 4.20 g/cc, wherein the heating rate above about 800° C. is between about 120° C./min and the rate at which said green body experiences thermal shock, and said sintering atmosphere is selected from the group consisting of argon-hydrogen and nitrogen-hydrogen in a molar ratio of argon or nitrogen to hydrogen of about 92:8 to 100:0;

introducing carbon monoxide to said sintering atmosphere during said sintering step only after said sintering temperature exceeds about 1400° C., wherein the amount of said carbon monoxide introduced is selected to inhibit reaction between said aluminum oxide and said hard refractory material.

2. A method in accordance with claim 1 wherein said powder mixture comprises about 1 weight percent titanium dioxide and said sintering atmosphere consists essentially of argon.

3. A method in accordance with claim 1 wherein said powder mixture includes no titanium dioxide and said sintering atmosphere consists essentially of at least one of argon-hydrogen and nitrogen-hydrogen in a molar ratio of argon or nitrogen to hydrogen of about 92:8.

4. A method in accordance with claim 1 wherein said effective amount of a sintering aid comprises about 0.2 weight percent magnesium oxide and about 4 weight percent zirconium oxide.

5. A method in accordance with claim 1 wherein said sintering step is carried out for about 5 min to about 2 hours.

6. A method in accordance with claim 1 wherein said step of introducing said carbon monoxide to said sintering atmosphere comprises placing a mass of graphite including adsorbed oxygen and water in proximity to said green body at initiation of said sintering step such that said mass releases carbon monoxide only after said sintering temperature exceeds 1400° C.

7. A method in accordance with claim 1 wherein said heating means is a static tungsten-element furnace.

8. A method in accordance with claim 1 wherein said step of preparing said green body comprises:
blending to produce a homogeneous powder mixture slurry said powder mixture and sufficient inert liquid medium to produce said slurry;
drying said slurry to remove a sufficient amount of said inert liquid medium to produce a shapable powder mixture;
shaping said shapable powder mixture to form said green body, said green body having a density of at least about 30 percent of the theoretical density of said sintered ceramic body.

9. A method of making a sintered ceramic body comprising the steps of:
preparing a ceramic green body from a powder mixture comprising aluminum oxide and a hard refractory material selected from the group consisting of titanium carbide and titanium carbonitride, in a weight ratio of aluminum oxide to hard refractory material of about 40:60 to about 95:5, and further comprising an effective amount of a densification aid, up to about 2 weight percent titanium dioxide based on the combined weights of said aluminum oxide, said hard refractory material, and said titanium dioxide, and 0 to about 8 weight percent wax binder based on the total weight of said powder mixture;
presintering said green body in a vacuum or hydrogen by heating to a presintering temperature of about 400°–800° C. for a time sufficient to remove any of said binder present in said green body and to form a presintered green body;
isopressing said presintered green body at a pressure sufficient to substantially completely collapse any cracks, macroscopic pores, or voids remaining in said presintered green body;
rapid sintering said isopressed presintered green body in a tungsten element furnace by heating in a sintering atmosphere in said furnace to a sintering temperature of about 1800°–1920° C. for a time sufficient to densify said isopressed presintered green body to a density of at least about 4.20 g/cc, wherein the heating rate above about 800° C. is between about 120° C./min and the rate at which said isopressed presintered green body experiences thermal shock, and said sintering atmosphere is selected from the group consisting of argon-hydrogen and nitrogen-hydrogen in a molar ratio of argon or nitrogen to hydrogen of about 92:8 to 100:0;
introducing carbon monoxide to said sintering atmosphere during said sintering step only after said sintering temperature exceeds about 1400° C., wherein the amount of said carbon monoxide introduced is selected to inhibit reaction between said aluminum oxide and said hard refractory material.

10. A method in accordance with claim 9 further comprising the step, after the sintering step, of:
hot isostatic pressing said sintered body in an inert atmosphere at a temperature of about 1650°–1850° C. and a pressure of about 10–25 ksi for about 5–60 min.

11. A method in accordance with claim 9 wherein said step of preparing said green body comprises:
blending to produce a homogeneous powder mixture slurry said powder mixture and sufficient inert liquid medium to produce said slurry;
drying said slurry to remove a sufficient amount of said inert liquid medium to produce a shapable powder mixture;
shaping said shapable powder mixture to form said green body, said green body having a density of at least about 30 percent of the theoretical density of said sintered ceramic body.

12. A method in accordance with claim 11 wherein said shaping step comprises shaping said shapable powder mixture to form said green body by die-pressing, injection molding, extrusion, isostatic pressing, or slip casting.

* * * * *